(12) United States Patent
Traupman et al.

(10) Patent No.: US 9,536,207 B2
(45) Date of Patent: Jan. 3, 2017

(54) USING DATA OBTAINED FROM AN ONLINE SOCIAL NETWORK TO OPTIMIZE SUBSCRIPTION OFFERS

(71) Applicant: LinkedIn Corporation, Mountain View, CA (US)

(72) Inventors: Jonathan D. Traupman, Oakland, CA (US); Tarun Kumar, Mountain View, CA (US); Venu Javarappa, San Jose, CA (US); Anmol Bhasin, Los Altos, CA (US); Lizabeth Li, Mountain View, CA (US); Yurong Shi, San Jose, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 254 days.

(21) Appl. No.: 14/079,300

(22) Filed: Nov. 13, 2013

(65) Prior Publication Data

US 2015/0134575 A1  May 14, 2015

(51) Int. Cl.
*G06N 5/04* (2006.01)
*G06N 99/00* (2010.01)

(52) U.S. Cl.
CPC .............. *G06N 99/005* (2013.01); *G06N 5/04* (2013.01)

(58) Field of Classification Search
None
See application file for complete search history.

(56) References Cited

U.S. PATENT DOCUMENTS

| 6,415,262 | B1* | 7/2002 | Walker | G06Q 30/02 705/14.25 |
| 7,606,772 | B2* | 10/2009 | Flinn et al. | 706/12 |
| 2012/0151514 | A1* | 6/2012 | Kandanala et al. | 725/23 |
| 2012/0233009 | A1* | 9/2012 | Fougner et al. | 705/26.3 |
| 2013/0031034 | A1* | 1/2013 | Gubin et al. | 706/12 |
| 2015/0112778 | A1* | 4/2015 | Feldman et al. | 705/14.16 |

OTHER PUBLICATIONS

"Key Concepts in Model Selection: Performance and Generalizability", Malcolm R. Forster, Journal of Mathematical Psychology, vol. 44 No. 1, 2000, pp. 205-231.*

* cited by examiner

*Primary Examiner* — Omar Fernandez Rivas
*Assistant Examiner* — Mai T Tran
(74) *Attorney, Agent, or Firm* — Park, Vaughan, Fleming & Dowler LLP

(57) ABSTRACT

The disclosed embodiments relate to a system that uses data from an online social network to optimize subscription offers. During operation of the online social network, the system gathers data associated with subscription offers that were presented to members of the online social network, including information about which subscription offers were converted. Next, the system uses a machine-learning technique to train a model based on the gathered data. Finally, the system uses the trained model to select subscription offers to present to a member of the online social network.

20 Claims, 5 Drawing Sheets

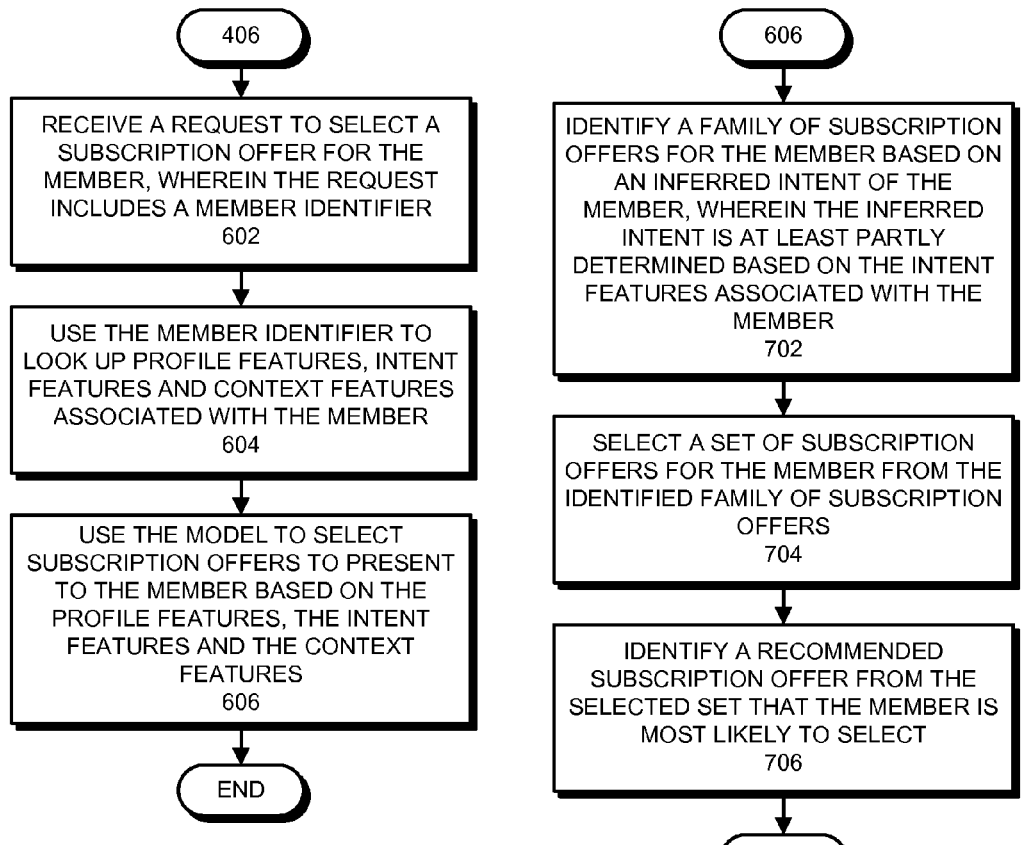

USING DATA OBTAINED FROM AN ONLINE SOCIAL NETWORK TO OPTIMIZE SUBSCRIPTION OFFERS

RELATED ART

The disclosed embodiments generally relate to techniques for optimizing the performance of online social networks. More specifically, the disclosed embodiments relate to a system that uses a machine-learning technique and data obtained from an online social network to optimize subscription offers that are presented to members of the online social network.

BACKGROUND

Perhaps the most significant development on the Internet in recent years has been the rapid proliferation of online social networks, such as LinkedIn® and Facebook®. Billions of users are presently accessing such social networks to connect with friends and acquaintances and to share personal and professional information. During operation, these online social networks routinely make millions of decisions each day to determine which types of information to present to users. Some of these decisions can directly affect the revenue of the online social network. In particular, online social networks routinely make decisions to determine which types of subscription offers to present to users. For example, a more-expensive subscription may allow a user to perform more-sophisticated searches through member records to look for sales leads, or may make it easier for a user to contact other members of the online social network.

However, designing a system to make good decisions about subscription offers can be a challenging task because a user's preferences and associated behavior can change over time. Hence, it is desirable for the decision-making methodology to be able to adapt to these changing preferences and behaviors.

BRIEF DESCRIPTION OF THE FIGURES

FIG. 6 presents a flow chart illustrating how the model can be used to select a subscription offer to present to a member of the online professional network in accordance with the disclosed embodiments.

FIG. 7 presents a flow chart illustrating additional details of the selection process in accordance with the disclosed embodiments.

DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system that uses data from an online social network to optimize subscription offers. During operation of the online social network, the system gathers data associated with subscription offers that were presented to members of the online social network, including information about which subscription offers were converted. Next, the system uses a machine-learning technique to train a model based on the gathered data. Finally, the system uses the trained model to select subscription offers to present to a member of the online social network.

The above-described technique is described in more detail below, but first we describe an exemplary system that uses the technique.

Computing Environment

Figure 1:
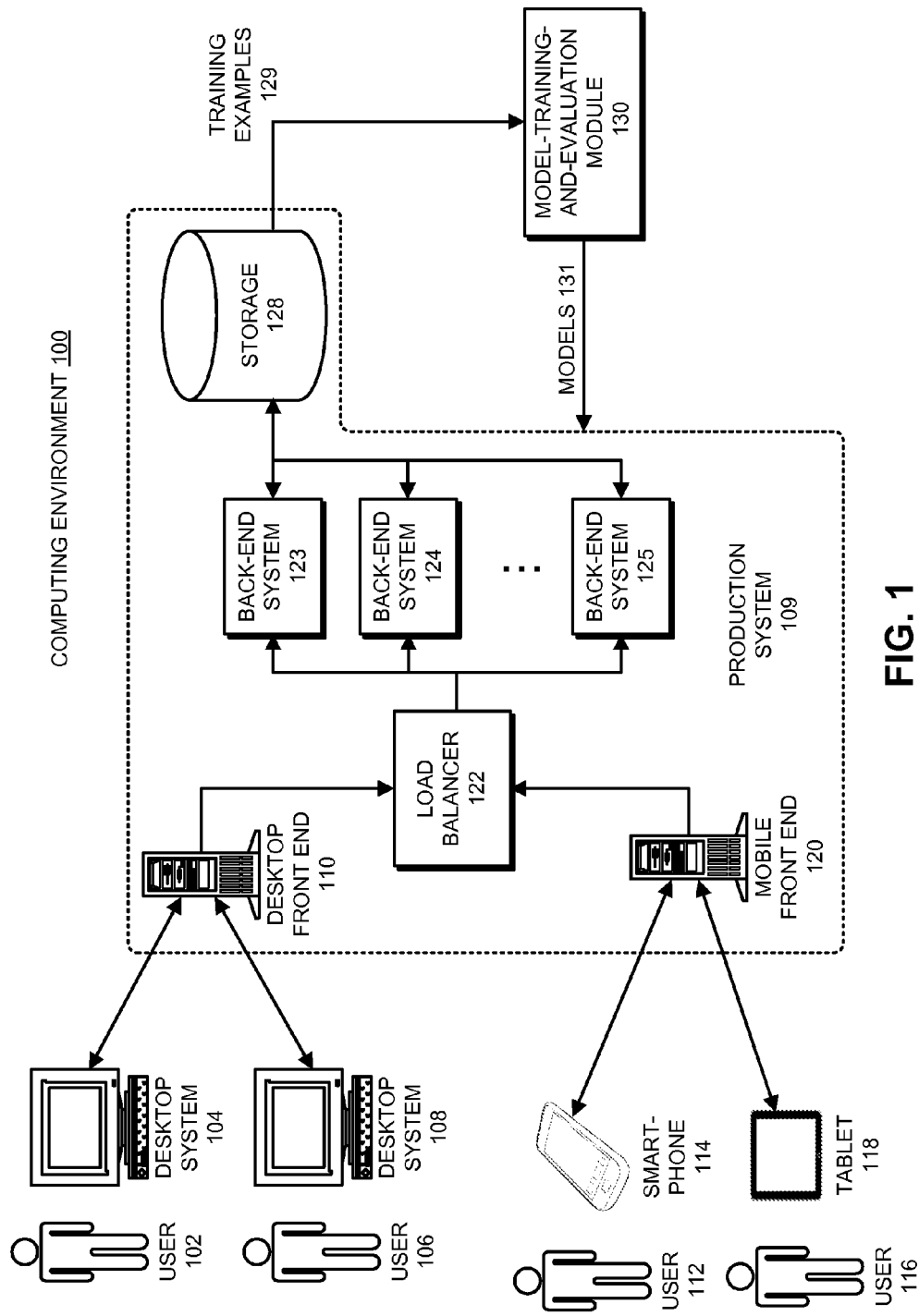
FIG. 1 illustrates a computing environment in accordance with the disclosed embodiments.

FIG. 1 illustrates an exemplary computing environment 100 for a specific type of online social network called an "online professional network," such as LinkedIn®, which is designed to facilitate professional contacts for business purposes. However, the described techniques are not meant to be limited to an online professional network, and can generally be applied to any online social network or similar system. As illustrated in FIG. 1, the online professional network can be accessed through browsers in desktop systems (104 and 108) that interact with a website for the online professional network. Alternatively, the online professional network can be accessed through mobile applications that act as gateways to an online professional network from associated mobile devices, including a smartphone 114 and a tablet computer 118.

More specifically, desktop systems 104 and 108 include browsers (not shown) which are operated by users 102 and 106, respectively. (Note that the terms "user" and "member" are used interchangeably throughout this specification and the attached claims.) Also note that desktop systems 104 and 108 can generally include any type of computer system that can interact with the online professional network through a browser. For example, desktop systems 104 and 108 can include a personal computer system, a server computer system, or even a laptop computer system. During operation, browsers in desktop systems 104 and 108 interact with a desktop front end 110 (within a production system 109), wherein desktop front end 110 provides services that make requests to various back-end systems 123-125 as is described in more detail below. Although only one desktop front end 110 is illustrated in FIG. 1, in general computing environment 100 can include a large number of desktop front ends. This enables the online professional network to simultaneously interact with thousands or even millions of users.

Mobile devices 114 and 118, which are operated by users 112 and 116, respectively, can generally include any type of portable electronic device that can interact with the online professional network through a mobile application. For example, these portable electronic devices can include a smartphone, a tablet computer, a network-connected music player, a gaming console and possibly a laptop computer system.

As mentioned above, mobile devices 114 and 118 execute mobile applications that function as portals to the online professional network. Although the illustrated embodiment shows only two mobile devices 114 and 118, in general computing environment 100 can include a large number of mobile devices and associated mobile application instances (possibly thousands or millions) that simultaneously access the online professional network.

These mobile applications interact with the online professional network through mobile front end 120, wherein mobile front end 120 includes services that make requests to various back-end systems 123-125 as is described in more detail below. Computing environment 100 can generally include a large number of mobile front-end systems, and is not limited to a single mobile front-end system 120 as is illustrated in FIG. 1. Moreover, mobile devices 114 and 118 communicate with mobile front end 120 through one or more networks (not shown), such as a Wi-Fi® network, a Bluetooth® network or a cellular data network.

During operation, users 102 and 106 of desktop systems 104 and 108, respectively, perform various actions while interacting with the online professional network through a browser-based interface. For example, these actions can include: browsing the user's home page, sending an email message to another user, editing the user's personal profile page, or searching for a specific user. These actions cause services in desktop front end 110 to generate requests, which are sent to back-end systems 123-125 through load balancer 122.

Similarly, users 112 and 116 of portable electronic devices 114 and 118, respectively, perform various actions while interacting with the online professional network through associated mobile applications. These actions cause services in mobile front end 120 to generate requests, which are sent to back-end systems 123-125 through load balancer 122.

Requests from desktop front end 110 and mobile front end 120 are sent to load balancer 122, which decides which back-end system 123-125 will receive each request. This decision can be based on a number of factors, including the load on each back-end system 123-125 and the priority of each request relative to other requests. For example, if a particular back-end system 123 is lightly loaded and other back-end systems 124 and 125 are more heavily loaded, load balancer 122 can decide to send the next request to back-end system 123.

The relative priority of requests can also affect how load balancer 122 directs requests. Some requests are relatively low priority, such as requests associated with background tasks that perform data-mining operations, whereas other requests are higher priority, such as a request to load a home page for a waiting user. Load balancer 122 can direct higher priority tasks to lightly loaded back-end systems, and can ensure that these back-end systems, which are running the higher priority tasks, remain lightly loaded. Conversely, load balancer 122 can direct lower-priority tasks to more highly loaded back-end systems, which are processing other lower-priority tasks.

During operation, back-end systems 123-125 service requests received from load balancer 122, which can involve reading from and writing to non-volatile storage device 128, such as disk drives or solid-state storage.

The system illustrated in FIG. 1 runs a model-training-and-evaluation module 130, which uses machine-learning techniques to train models that make predictions for online social networks. During operation, model-training-and-evaluation module 130 collects training examples 129 from storage system 128, wherein the training examples 129 include various features that can be used to determine a specific response to be predicted. Next, model-training-and-evaluation module 130 uses training examples 129 to train and evaluate one or more models 131 that can be pushed to production system 109 to make decisions for production system 109.

Decision-Making Model

Figure 2:
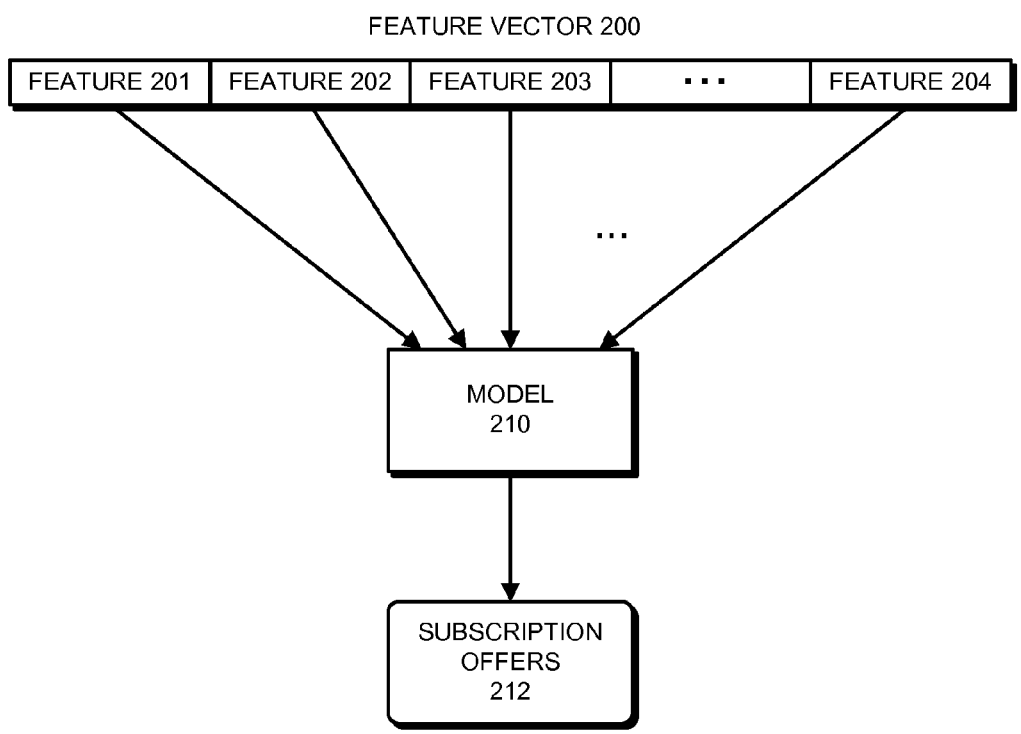
FIG. 2 illustrates how a model operates on a feature vector to select subscription offers in accordance with the disclosed embodiments.

FIG. 2 illustrates how a decision-making model 210 operates on a feature vector 200 to select a set of subscription offers 212 in accordance with the disclosed embodiments. During operation, model 210 receives inputs from feature vector 200. These inputs include a number of individual features 201-204, which can include any type of information from the online professional network that can be used to produce subscription offers 212. For example, the features 201-204 can include "member profile features," which are obtained from a member's profile in the online professional network, such as the member's industry, the member's title, the member's company, the company's size, the member's experience, and the member's connections within the online professional network. Features 201-204 can also include "intent features," which are associated with a member's behavior while interacting with the online professional network, such as a record of the member's searches, browsing behavior, link activity and email activity.

Features 201-204 can additionally include "context features" which provide information about the context in which the member was interacting with the online professional network during a conversion, such as: the time and date of a conversion; the geographic location of the member; the current page the member was viewing; how often the member had visited the current page; whether the member was accessing the online professional network from a mobile device, a tablet or a desktop system; and whether the member is presently receiving a promotional offer. The context features can also include details about the manner in which a subscription offer was made. For example, if the system displayed three subscription offers to a member and the member converted on one of the offers, the system can keep track of which three offers were displayed, because different combinations of subscription offers may lead to different conversion rates.

Next, model 210 uses these features 201-204 to generate a response, which comprises a set of subscription offers 212 to present to a member. Note that model 210 can generally be implemented and trained using any one of a large number of possible machine-learning techniques, including but not limited to: logistic regression, neural networks, decision-tree learning, association rule learning, genetic programming, inductive logic programming, support vector machines, cluster analysis, Bayesian networks, reinforcement learning, representation learning, similarity learning and sparse dictionary learning. Moreover, the system that trains these models has a modular structure that allows components for different machine-learning techniques to be used by the system.

Also note that a feature vector and its associated response are referred to as a "training example," wherein a training example can be used to train various models to make predictions for the online professional network as is described in more detail below with reference to the flow charts in FIGS. 3-7.

Subscription Offers

Figure 3:
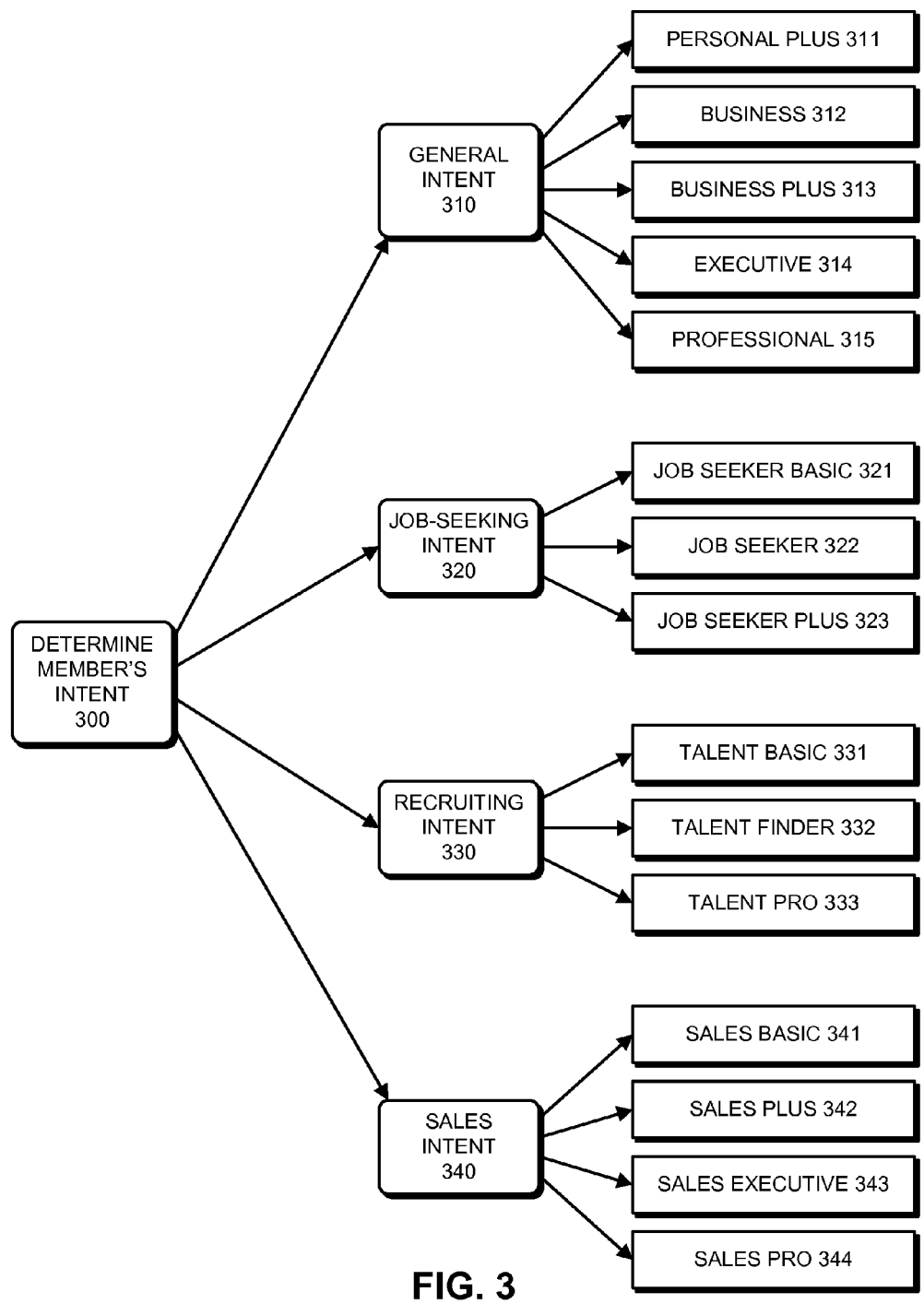
FIG. 3 illustrates an exemplary set of subscription offers for an online professional network in accordance with the disclosed embodiments.

FIG. 3 illustrates an exemplary set of subscription offers for an online professional network in accordance with the disclosed embodiments. These subscription offers fall into four different "families," which are associated with different member intents. As illustrated in FIG. 3, the different member intents for the online professional network can include (1) a "general intent," (2) a "job-seeking intent," (3) a "recruiting intent" (which is also referred to as a "talent-seeking intent") and (4) a "sales intent."

The first step in selecting a subscription offer for a member is to determine the member's intent 300. This can be accomplished by examining various features, including intent features that are associated with the member's actions. For example, if a member searches through a large number of member profiles and also posts job listings, the member is likely to have a recruiting intent. Similarly, if a member searches through a large number of job postings, the member is likely to have job-seeking intent. Note that a member can have more than one type of intent. For example, a manager of a sales organization may be looking to hire a salesperson, in which case the manager would have recruiting intent as well as sales intent. After the manager hires the salesperson, the manager will continue to have sales intent, but will no longer have recruiting intent.

After the member's intent is determined, the system selects a set of subscription offers to present to the member from the associated family of subscription offers. For the general intent family 310, there are five possible subscription offers, including personal plus 311, business 312, business plus 313, executive 314 and professional 315. For the job-seeking intent family 320, there are three possible subscription offers, including job seeker basic 321, job seeker 322 and job seeker plus 323. For the recruiting intent family 330, there are three possible subscription offers, including talent basic 331, talent finder 332 and talent pro 333. Finally, for the sales intent family 340, there are four possible subscription offers, including sales basic 341, sales plus 342, sales executive 343 and sales pro 344.

Within each intent family, the associated subscriptions provide different capabilities and have different prices. For example, a more-expensive subscription may allow the member to perform more-sophisticated searches, or may allow the member to view additional information about other members of the online professional network.

In some embodiments, the system displays a set of subscription offers to the member and allows the member to select one of them. For example, the system can display three subscriptions to the member, including a subscription that the member is most likely to convert on, a less-expensive subscription with fewer capabilities, and a more-expensive subscription with additional capabilities.

Selecting Subscription Offers

Figure 4:
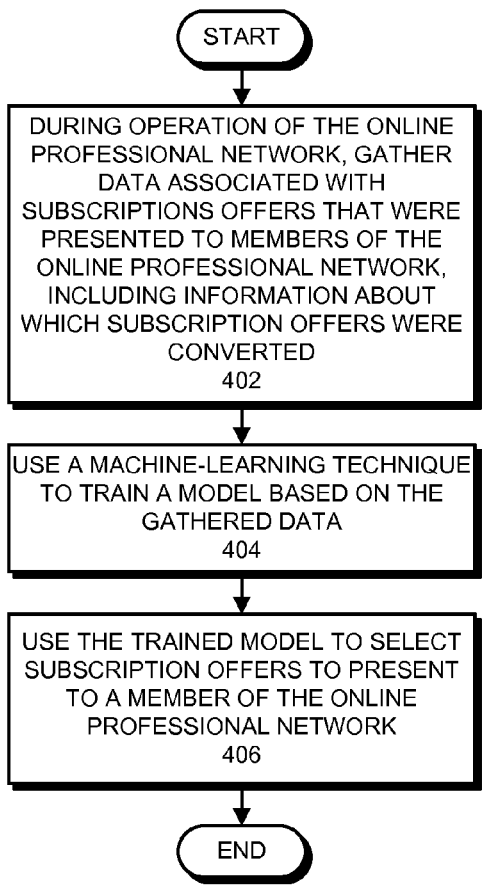
FIG. 4 presents a flow chart illustrating how subscription offers are selected based on data gathered from an online professional network in accordance with the disclosed embodiments.

FIG. 4 presents a flow chart illustrating how subscription offers are selected based on data gathered from an online professional network in accordance with the disclosed embodiments. During operation of the online professional network, the system gathers data associated with subscription offers that were presented to members of the online professional network, including information about which subscription offers were converted (step 402). For example, the system can gather three months of historic data about subscription conversions. Next, the system uses a machine-learning technique to train a model based on the gathered data (step 404). Finally, the system uses the trained model to select subscription offers to present to a member of the online professional network (step 406).

Training and Evaluating Models

Figure 5:
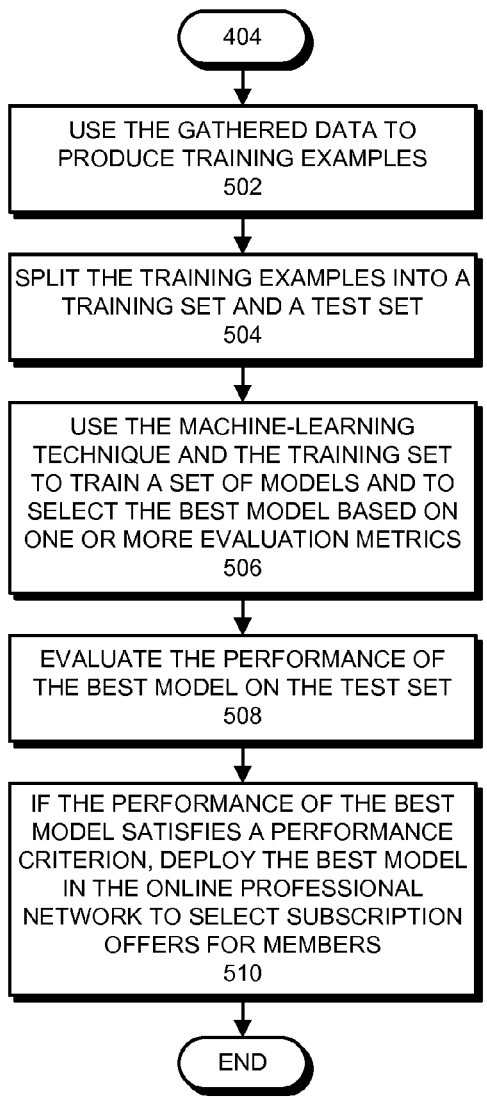
FIG. 5 presents a flow chart illustrating how a machine-learning technique can be used to train and select a model in accordance with the disclosed embodiments.

FIG. 5 presents a flow chart illustrating how a machine-learning technique can be used to train and select a model in accordance with the disclosed embodiments. This training-and-selection process can occur periodically, for example weekly, during operation of the online professional network. During this training-and-selection process, the system first produces training examples from the gathered data (step 502). This can involve performing sampling operations to select training events that are relevant to the model to be trained. (For example, the system can sample training events for subscription conversions that are not associated with promotional offers.) Next, for each selected training event, the system extracts features that can be used to generate a response for the training event, wherein the features and response comprise a training example. (As mentioned above, these features can include member profile features, intent features and context features.)

Next, the system splits the training examples into a training set and a test set (step 504). The system then uses a machine-learning technique to train a set of models using the training set, and to select a best model based on one or more evaluation metrics (step 506). (As mentioned above, a large number of possible machine-learning techniques can be used to train the models.) After a best model is selected, the system evaluates the performance of the best model by running the best model on the test set (step 508). Finally, if the performance of the best model satisfies a performance criterion, the system deploys the best model in the online professional network to select subscription offers for members (step 510).

Using a Model to Select a Subscription Offer

FIG. 6 presents a flow chart illustrating how a model can be used to select a subscription offer for a member in accordance with the disclosed embodiments. First, the system receives a request to select a subscription offer for the member, wherein the request includes a member identifier (step 602). For example, the request can be automatically generated when the member navigates to a "subscription chooser page" that displays subscription offers. Next, the system uses the member identifier to look up features (including profile features, intent features and context features) associated with the member (step 604). Finally, the system uses the model to select subscription offers to present to the member based on the features (step 606).

The process of selecting a subscription offer in step 606 can be further divided into a number of steps as is illustrated in FIG. 7. First, the system identifies a family of subscription offers for the member based on an inferred intent of the member, wherein the inferred intent can be at least partly determined based on the intent features associated with the member (step 702). Next, the system selects subscription offers for the member from the identified family of subscription offers (step 704). Finally, the system identifies a recommended subscription offer from the selected set that the member is most likely to select (step 706).

Note that the process of determining a family of subscription offers can possibly involve using a different model than the process of selecting a set of subscription offers from the family. In this case, the system trains two models, a first model for determining the member's intent, wherein the member's intent is used to select a family of subscription offers, and a second model for selecting a set of offers from the determined family of subscription offers.

Extensions

The above-described system can also take into account the life-time value (LTV) of a subscription. Note that there can be a tradeoff between long-term and short-term revenue for different plans. For example, if a member converts on a monthly subscription for $39.95/month, the online professional network will make more money in the short-run than if the member converts on an annual subscription for $249.95/year. However, the long-run revenue for the annual plan is likely to be higher. This LTV can be accounted for by calculating the expected revenue for different subscription offers. This expected revenue can account for: (1) the probability that the member will convert on an offer, and (2) the LTV of a conversion, which accounts for recurring revenue, including recurring revenue from subscription renewals.

Other optimizations are possible. For example, if a member has visited the subscription choice page three times and has not converted, the system can decide to present a different set of subscription offers to the member. Moreover, if the member previously clicked on a "see-more" button for a subscription offer, the next time the member visits the subscription choice page, the system can show the member the same subscription offer along with two related subscription offers.

The foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A computer-implemented method for using data from an online social network to optimize subscription offers, comprising:

during operation of the online social network, gathering data associated with subscription offers that were presented to members of the online social network, including information about which subscription offers were converted;

using a machine-learning technique to train a model based on the gathered data;

determining an inferred intent of a member of the online social network based on profile features, intent features and context features associated with the member, wherein the member is associated with more than one type of intent, and wherein each type of intent is associated with a different family of subscription offers;

identifying an associated family of subscription offers based on the determined inferred intent of the member, wherein different subscription offers in the identified family provide different capabilities with different prices; and using the trained model to select a set of subscription offers from the identified family to present to the member of the online social network based on the inferred intent, wherein the set of subscription offers comprises at least one of the following:

a less-expensive subscription offer with fewer capabilities, and a more-expensive subscription offer with additional capabilities.

2. The computer-implemented method of claim 1, wherein the gathered data includes features which are used by the model to select the subscription offers, wherein the features include:

member profile features which are obtained from a member's profile in the online social network;

intent features which are associated with a member's behavior while interacting with the online social network; and context features which provide information about the context in which a subscription offer was converted.

3. The computer-implemented method of claim 1, wherein using the machine-learning technique to train the model based on the gathered data comprises:

using the gathered data to produce training examples;

splitting the training examples into a training set and a test set;

using the machine-learning technique and the training set to train a set of models and to select the best model based on one or more evaluation metrics;

evaluating the performance of the best model on the test set; and if the performance of the best model satisfies a performance criterion, deploying the best model in the online social network to select subscription offers for members.

4. The computer-implemented method of claim 1, wherein using the trained model to select subscription offers to present to the member comprises:

receiving a request to select a subscription offer for the member, wherein the request includes a member identifier;

using the member identifier to look up profile features, intent features and context features associated with the member; and choosing the one subscription family and the one or more subscription offers based on the profile features, the intent features and the context features.

5. The computer-implemented method of claim 1, wherein choosing one or more subscription offers unique to the one subscription family comprises:

identifying a set of subscription offers associated with the one subscription family; and selecting a recommended subscription offer from the identified set that the member is most likely to select.

6. The computer-implemented method of claim 1, further comprising repeating the data gathering and training operations to continually update the model during operation of the online social network.

7. The computer-implemented method of claim 1, wherein the online social network is an online professional network.

8. A non-transitory computer-readable storage medium storing instructions that when executed by a computer cause the computer to perform a method for using data from an online social network to optimize subscription offers, comprising:

during operation of the online social network, gathering data associated with subscription offers that were presented to members of the online social network, including information about which subscription offers were converted;

using a machine-learning technique to train a model based on the gathered data;

determining an inferred intent of a member of the online social network based on profile features, intent features and context features associated with the member, wherein the member is associated with more than one type of intent, and wherein each type of intent is associated with a different family of subscription offers;

identifying an associated family of subscription offers based on the determined inferred intent of the member, wherein different subscription offers in the identified family provide different capabilities with different prices; and using the trained model to select a set of subscription offers from the identified family to present to the member of the online social network based on the inferred intent, wherein the set of subscription offers comprises at least one of the following:

a less-expensive subscription offer with fewer capabilities, and a more-expensive subscription offer with additional capabilities.

9. The non-transitory computer-readable storage medium of claim 8, wherein the gathered data includes features which are used by the model to select the subscription offers, wherein the features include:

member profile features which are obtained from a member's profile in the online social network;

intent features which are associated with a member's behavior while interacting with the online social network; and context features which provide information about the context in which a subscription offer was converted.

10. The non-transitory computer-readable storage medium of claim 8, wherein using the machine-learning technique to train the model based on the gathered data comprises:

using the gathered data to produce training examples;

splitting the training examples into a training set and a test set;

using the machine-learning technique and the training set to train a set of models and to select the best model based on one or more evaluation metrics;

evaluating the performance of the best model on the test set; and if the performance of the best model satisfies a performance criterion, deploying the best model in the online social network to select subscription offers for members.

11. The non-transitory computer-readable storage medium of claim 8, wherein using the trained model to select subscription offers to present to the member comprises:

receiving a request to select a subscription offer for the member, wherein the request includes a member identifier;

using the member identifier to look up profile features, intent features and context features associated with the member; and choosing the one subscription family and the one or more subscription offers based on the profile features, the intent features and the context features.

12. The non-transitory computer-readable storage medium of claim 8, wherein choosing one or more subscription offers unique to the one subscription family comprises:

identifying a set of subscription offers associated with the one subscription family; and selecting a recommended subscription offer from the identified set that the member is most likely to select.

13. The non-transitory computer-readable storage medium of claim 8, wherein the method further comprises repeating the data gathering and training operations to continually update the model during operation of the online social network.

14. The non-transitory computer-readable storage medium of claim 8, wherein the online social network is an online professional network.

15. A system that facilitates an automatic machine-learning process for an online social network, comprising:

a computing system including a processor and a memory;

wherein the computing system is configured to run an online social network; and wherein the online social network is configured to:

gather data associated with subscription offers that were presented to members of the online social network, including information about which subscription offers were converted;

use a machine-learning technique to train a model based on the gathered data;

determine an inferred intent of a member of the online social network based on profile features, intent features and context features associated with the member, wherein the member is associated with more than one type of intent, and wherein each type of intent is associated with a different family of subscription offers;

identify an associated family of subscription offers based on the determined inferred intent of the member, wherein different subscription offers in the identified family provide different capabilities with different prices; and use the trained model to select a set of subscription offers from the identified family to present to the member of the online social network based on the inferred intent, wherein the set of subscription offers comprises at least one of the following:

a less-expensive subscription offer with fewer capabilities, and a more-expensive subscription offer with additional capabilities.

16. The system of claim 15, wherein while using the machine-learning technique to train the model, the online social network is configured to:
- use the gathered data to produce training examples;
- split the training examples into a training set and a test set;
- use the machine-learning technique and the training set to train a set of models and to select the best model based on one or more evaluation metrics;
- evaluate the performance of the best model on the test set; and
- if the performance of the best model satisfies a performance criterion, deploy the best model in the online social network to select subscription offers for members.

17. The system of claim 15, wherein while using the trained model to select subscription offers to present to the member, the online social network is configured to:
- receive a request to select a subscription offer for the member, wherein the request includes a member identifier;
- use the member identifier to look up profile features, intent features and context features associated with the member; and
- choose the one subscription family and the one or more subscription offers based on the profile features, the intent features and the context features.

18. The system of claim 15, wherein choosing one or more subscription offers unique to the one subscription family comprises:
- identify a set of subscription offers associated with the one subscription family; and
- select a recommended subscription offer from the identified set that the member is most likely to select.

19. The system of claim 15, wherein the online social network is configured to repeat the data gathering and training operations to continually update the model during operation of the online social network.

20. The system of claim 15, wherein the online social network is an online professional network.

* * * * *